US008538080B2

(12) United States Patent
Pu et al.

(10) Patent No.: US 8,538,080 B2
(45) Date of Patent: Sep. 17, 2013

(54) FLAME IDENTIFICATION METHOD AND DEVICE USING IMAGE ANALYSES IN HSI COLOR SPACE

(75) Inventors: Yong-Ren Pu, Tainan (TW); Su-Hsing Lee, Tainan (TW); Yung-Jen Chen, Tainan (TW)

(73) Assignee: Chang Jung Christian University, Tainan (TW)

( * ) Notice: Subject to any disclaimer, the term of this patent is extended or adjusted under 35 U.S.C. 154(b) by 229 days.

(21) Appl. No.: 13/229,153

(22) Filed: Sep. 9, 2011

(65) Prior Publication Data
US 2012/0195462 A1 Aug. 2, 2012

(30) Foreign Application Priority Data

Jan. 27, 2011 (TW) .............................. 100103079 A

(51) Int. Cl.
*G06K 9/00* (2006.01)
*G06K 9/34* (2006.01)

(52) U.S. Cl.
USPC ............ 382/103; 382/100; 382/162; 382/173

(58) Field of Classification Search
USPC .................................. 382/100, 103, 162, 173
See application file for complete search history.

(56) References Cited

U.S. PATENT DOCUMENTS

| 7,542,585 | B2 * | 6/2009 | Chen .............................. | 382/100 |
| 7,609,852 | B2 * | 10/2009 | Chen .............................. | 382/100 |
| 7,786,877 | B2 * | 8/2010 | Hou ............................... | 340/578 |
| 8,462,980 | B2 * | 6/2013 | Caballero et al. ............. | 382/100 |

OTHER PUBLICATIONS

Wen-Bing Horng; Jian-Wen Peng; Chih-Yuan Chen, "A new image-based real-time flame detection method using color analysis," Networking, Sensing and Control, 2005. Proceedings. 2005 IEEE, vol. No. pp. 100,105, Mar. 19-22, 2005.*

Juan Chen, Yaping He, Jian Wang, "Multi-feature fusion based fast video flame detection" Building and Environment, vol. 45, Issue 5, May 2010, pp. 1113-1122.*

Bo-Ho Cho; Jong-Wook Bae; Sung-Hwan Jung, "Image Processing-Based Fire Detection System Using Statistic Color Model," Advanced Language Processing and Web Information Technology, 2008. ALPIT '08. International Conference on, vol. No. pp. 245,250, Jul. 23-25, 2008.*

Tai-Fang Lu, Chien-Yuan Peng, Wen-Bing Horng, Jian-Wen Peng, "Flame Feature Model Development and Its Application to Flame Detection," icicic, vol. 1, pp. 158-161, First International Conference on Innovative Computing, Information and Control—vol. I (ICICIC'06), 2006.*

* cited by examiner

*Primary Examiner* — Utpal Shah
(74) *Attorney, Agent, or Firm* — Hamre, Schumann, Mueller & Larson, P.C.

(57) ABSTRACT

In a flame identification method and device for identifying any flame image in a plurality of frames captured consecutively from a monitored area, for each image frame, intensity foreground pixels are obtained based on intensity values of pixels, a fire-like image region containing the intensity foreground pixels is defined when an intensity foreground area corresponding to the intensity foreground pixels is greater than a predetermined intensity foreground area threshold, and saturation foreground pixels are obtained from all pixels in the fire-like image region based on saturation values thereof to obtain a saturation foreground area corresponding to the saturation foreground pixels. Linear regression analyses are performed on two-dimensional coordinates each formed by the intensity and saturation pixel areas associated with a corresponding image frame to generate a determination coefficient. Whether a flame image exists in the image frames is determined based on the determination coefficient and a predetermined identification threshold.

12 Claims, 6 Drawing Sheets

FLAME IDENTIFICATION METHOD AND DEVICE USING IMAGE ANALYSES IN HSI COLOR SPACE

CROSS-REFERENCE TO RELATED APPLICATION

This application claims priority to Taiwanese Application No. 100103079, filed on Jan. 27, 2011.

BACKGROUND OF THE INVENTION

1. Field of the Invention

The invention relates to a flame identification method and device, and more particularly to a flame identification method and device using image analyzing techniques.

2. Description of the Related Art

Generally, conventional fire detectors can be divided into three types, such as thermal-type, smoke-type and flame-type. A thermal-type fire detector detects temperature of a monitored space, and is activated to generate an alarm output upon detecting that the temperature of the monitored space reaches a high temperature. A smoke-type fire detector is activated to generate an alarm output upon detection of heavy smoke in a monitored space. A flame-type fire detector is activated to generate an alarm output upon detecting that the intensity of infrared or ultraviolet light irradiated by flames in a monitored space reaches a threshold intensity. However, such the conventional fire detectors may not effectively and accurately detect fire occurring in an open or large monitored space.

A conventional flame detector using image analyzing techniques is provided to detect a flame image in an image frame, which is captured from a monitor area, in a color model. In order to improve the accuracy of flame detection, a frequency domain response of an outline of the flame image obtained through fast Fourier transformation (FFT) must be analyzed. As a result, a computer appliance with high computation capability is required to perform flickering frequency analyses for a moving flame. Therefore, improvements may be made to the above techniques.

SUMMARY OF THE INVENTION

Therefore, an object of the present invention is to provide a flame identification method and device using image analyses in hue-saturation-intensity color space that can overcome the aforesaid drawbacks of the prior art.

According to one aspect of the present invention, there is provided a flame identification method of identifying any flame image in a plurality of image frames captured consecutively from a monitored area. Each of image frames includes a plurality of pixels each having pixel data converted into a hue value, a saturation value and an intensity value in hue-saturation-intensity (HSI) color space. The flame identification method comprises the steps of:

a) for each of the image frames, filtering the pixels based on the intensity values corresponding to the pixels, and intensity reference information to divide the pixels into intensity foreground pixels associated with fire-like intensity performance and intensity background pixels so as to obtain an intensity foreground area corresponding to the intensity foreground pixels, and so as to define within a corresponding one of the image frames a fire-like image region that contains the intensity foreground pixels when the intensity foreground area is greater than a predetermined intensity foreground area threshold, filtering all pixels in the fire-like image region based on the saturation values corresponding to all the pixels in the fire-like image region, and saturation reference information to divide all the pixels in the fire-like image region into first saturation foreground pixels associated with weak-fire saturation performance and saturation background pixels so as to obtain a first saturation foreground area corresponding to the first saturation foreground pixels, and combining the intensity foreground area and the first saturation foreground area associated with the corresponding one of image frames to form a first two-dimensional (2-D) coordinate;

b) when a number (N) of the first 2-D coordinates corresponding to a sequence of the image frames are formed consecutively in step a), performing linear regression analyses on the first 2-D coordinates to generate a first determination coefficient; and c) determining whether a flame image exists in the image frames based on at least a predetermined number of the first determination coefficients generated consecutively in step b), and a predetermined identification threshold.

According to another aspect of the present invention, there is provided a flame identification device for identifying any flame image in a plurality of image frames captured consecutively from a monitored area. Each of the image frames includes a plurality of pixels, each of which has pixel data. The flame identification device comprises:

a pixel data processor for converting the pixel data of each of the pixels of each of the image frames into a hue value, a saturation value and an intensity value in hue-saturation-intensity (HSI) color space;

a memory unit for storing intensity reference information and saturation reference information; and a processing unit coupled to the pixel data processor and the memory unit, and receiving the intensity values and the saturation values corresponding to each of the image frames from the pixel data processor, and including an intensity processor configured to filter, for each of the image frames, the pixels based on the intensity values corresponding to the pixels, and the intensity reference information from the memory unit to divide the pixels into intensity foreground pixels associated with fire-like intensity performance and intensity background pixels so as to obtain an intensity foreground area corresponding to the intensity foreground pixels, to determine whether the intensity foreground area is greater than a predetermined intensity foreground area threshold, and to define within a corresponding one of the image frames a fire-like image region that contains the intensity foreground pixels upon detecting that the intensity foreground area is greater than the predetermined intensity foreground area threshold, and a saturation processor configured to filter all pixels in the fire-like image region defined by the intensity processor based on the saturation values corresponding to all the pixels in the fire-like image region, and the saturation reference information from the memory unit to divide all the pixels in the fire-like image region into first saturation foreground pixels associated with weak-fire saturation performance and saturation background pixels so as to obtain a first saturation foreground area corresponding to the first saturation foreground pixels, and an determination processor configured to combine the intensity foreground area and the first saturation foreground area associated with the corresponding one of the image frames to form a first two-dimensional (2-D) coordinate, to perform linear regression analyses on a number (N) of the first 2-D coordinates corresponding to a sequence of the image frames and formed consecutively thereby to generate a first determination coefficient, and to determine whether a flame image exists in the image frames based on at least a predetermined number of the first determination coefficients generated consecutively thereby, and a predetermined identification threshold.

BRIEF DESCRIPTION OF THE DRAWINGS

Other features and advantages of the present invention will become apparent in the following detailed description of the preferred embodiments with reference to the accompanying drawings, of which:

FIG. 3b shows a sub-image frame consisting of a plurality of intensity foreground pixels obtained from the image frame of FIG. 3a;

FIG. 3c shows a sub-image frame consisting of a plurality of first saturation foreground pixels of the like-fire image region in FIG. 3a.

DETAILED DESCRIPTION OF THE PREFERRED EMBODIMENT

Figure 1:
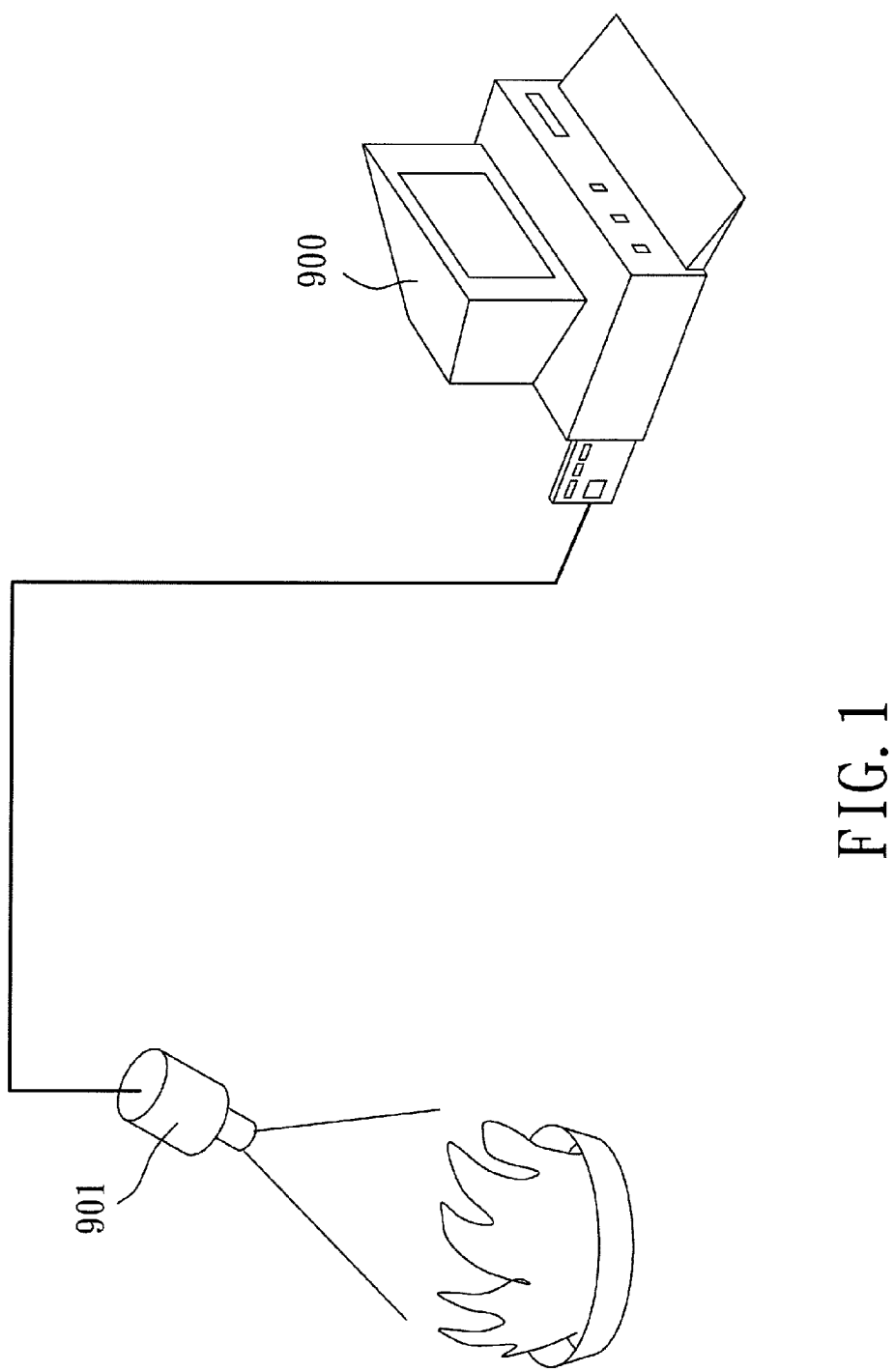
FIG. 1 is a schematic view showing a fire detecting system containing the preferred embodiment of a flame identification device according to the present invention.

Referring to FIG. 1, a fire detecting system for detecting whether a fire occurs in a monitored area is shown to include an image capturing device 901, and the preferred embodiment of a flame identification device according to the present invention. The image capturing device 901 captures consecutively a plurality of image frames from the monitored area. Each image frame includes a plurality of pixels, each of which has pixel data. In this embodiment, the flame identification device is implemented into a computer apparatus 900. The flame identification device is used to identify any flame image in the image frames captured by the image capturing device 901. Therefore, the fire detecting system can detect whether a fire occurs in the monitored area in accordance with identification result made by the flame identification device.

Figure 2:
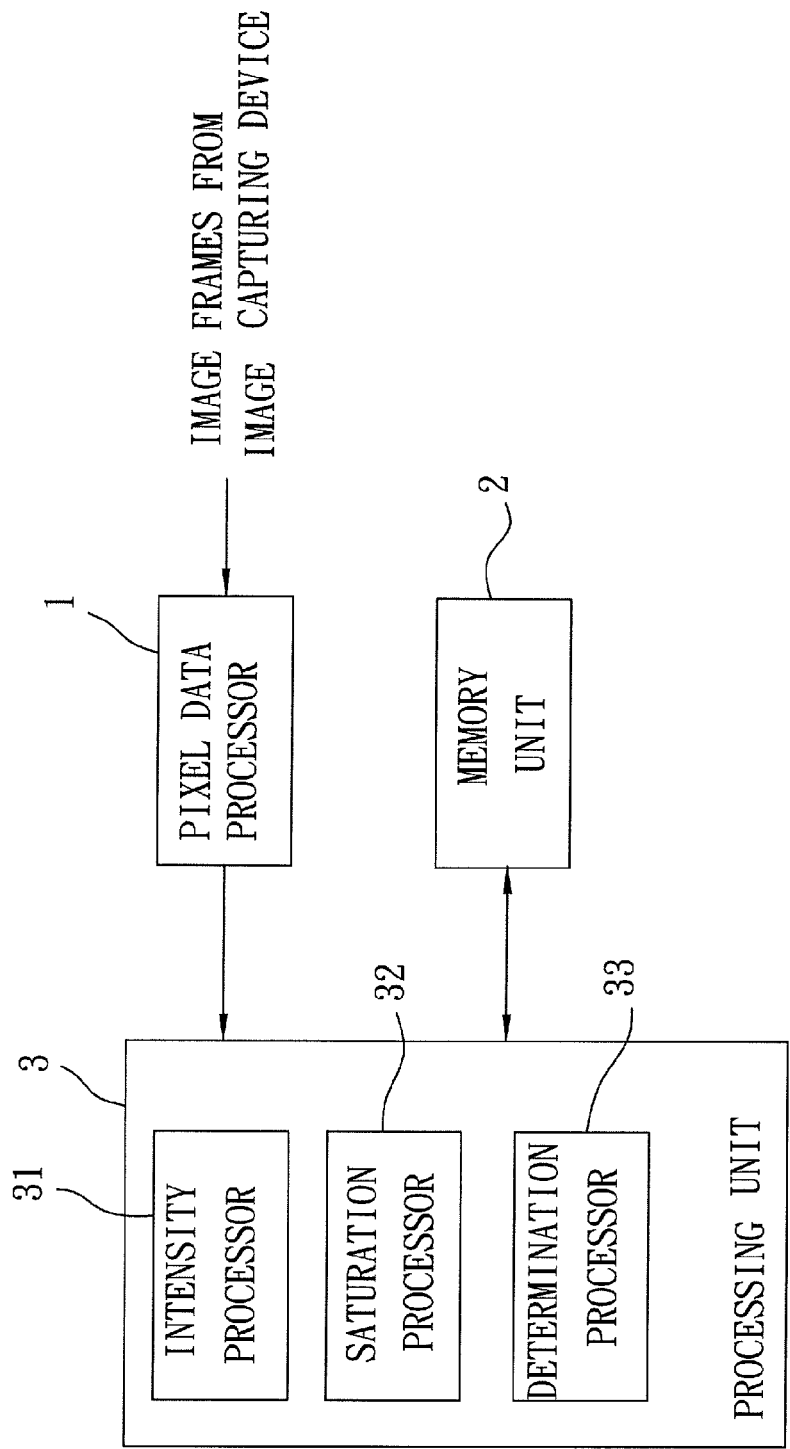
FIG. 2 is a schematic circuit block diagram illustrating the preferred embodiment.

Referring to FIG. 2, the flame identification device is shown to include a pixel data processor 1, a memory unit 2, and a processing unit 3.

The pixel data processor 1 is connected electrically to the image capturing device 901. The pixel data processor 1 receives the image frames from the image capturing device 901, and converts the pixel data of each pixel of each image frame into a hue value, a saturation value and an intensity value in hue-saturation-intensity color space.

The memory unit 2 is coupled to the pixel data processor 1, and stores intensity reference information and saturation reference information.

In this embodiment, the intensity reference information includes a predetermined intensity foreground threshold, a predetermined intensity variation lower limit value ($\sigma_{(I)min}$), a predetermined intensity amplification ratio ($B_{(I)}$), a predetermined intensity weight ($\beta_{(I)}$), and a plurality of sets of intensity average values ($\overline{P}_{(I)}$), intensity average variation values ($\overline{\sigma}_{(I)}$) and intensity average variation thresholds ($\overline{\sigma}_{(I)threshold}$). Each set of the intensity average value ($\overline{P}_{(I)}$), the intensity average variation value ($\overline{\sigma}_{(I)}$) and the intensity average variation threshold ($\overline{\sigma}_{(I)threshold}$) is preset previously for a corresponding pixel. It is noted that, initially, the pixel data processor 1 processes the intensity values of corresponding pixels in a number (M) of the image frames captured initially and consecutively by the image capturing device 901 such that the intensity average value ($\overline{P}_{(I)}$) and the intensity average variation value ($\overline{\sigma}_{(I)}$) for each corresponding pixel to be stored in the memory unit 2 can be obtained respectively from the following Equations (1) and (2):

$$\overline{P}_{(I)} = \frac{\sum_{i=1}^{M} p_{(I)i}}{M}, M \geq 2 \qquad (1)$$

$$\overline{\sigma}_{(I)} = \frac{\sum_{i=2}^{M} |p_{(I)i} - p_{(I)i-1}|}{M-1} \qquad (2)$$

where $p_{(I)i}$ denotes the intensity value of the corresponding pixel in the $i^{th}$ image frame, and $p_{(I)i-1}$ denotes the intensity value of the corresponding pixel in the $(i-1)^{th}$ image frame.

The saturation reference information includes a predetermined saturation lower limit value, a predetermined saturation upper limit value, a predetermined saturation variation lower limit value ($\sigma_{(S)min}$), a predetermined saturation amplification ratio ($B_{(S)}$), a predetermined saturation weight ($\beta_{(S)}$), and a plurality of sets of saturation average values ($\overline{P}_{(S)}$), saturation average variation values ($\overline{\sigma}_{(S)}$) and saturation average variation thresholds ($\overline{\sigma}_{(S)threshold}$). Each set of the saturation average value ($\overline{P}_{(S)}$), the saturation average variation value ($\overline{\sigma}_{(S)}$) and the saturation average variation threshold ($\overline{\sigma}_{(S)threshold}$) is preset previously for a corresponding pixel. Initially, the pixel data processor 1 processes the saturation values of corresponding pixels in the number (M) of the image frames such that the saturation average values ($\overline{P}_{(S)}$) and the saturation average variation values ($\overline{\sigma}_{(S)}$) for each corresponding pixel to be stored in the memory unit 2 can be obtained respectively from the following Equations (3) and (4):

$$\overline{P}_{(S)} = \frac{\sum_{i=1}^{M} p_{(S)i}}{M}, M \geq 2 \qquad (3)$$

$$\overline{\sigma}_{(S)} = \frac{\sum_{i=2}^{M} |p_{(S)i} - p_{(S)i-1}|}{M-1} \qquad (4)$$

where $p_{(S)i}$ denotes the saturation value of the corresponding pixel in the $i^{th}$ image frame, and $p_{(S)i-1}$ denotes the saturation value of the corresponding pixel in the $(i-1)^{th}$ image frame.

Figure 3A:
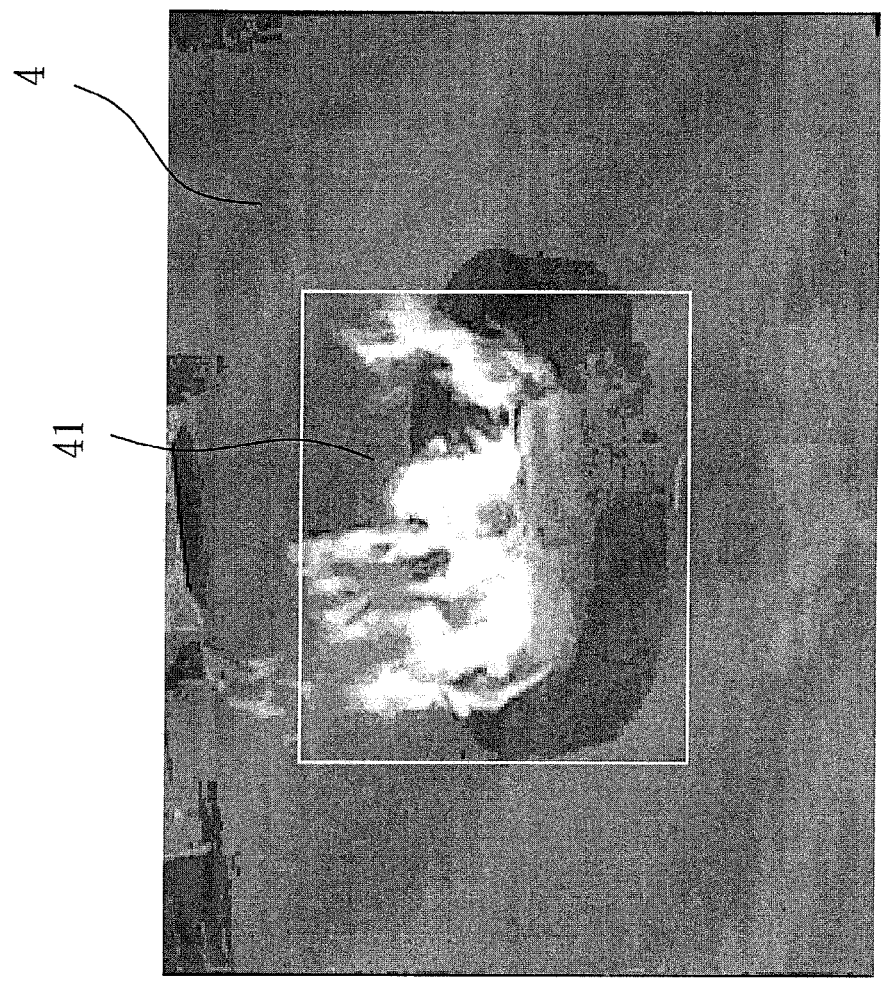
FIG. 3a shows an image frame captured by an image capturing device and defined with a fire-like image region.

The processing unit 3 is coupled to the pixel data processor 2 and the memory unit 2, and receives the intensity values and the saturation values corresponding to each image frame from the pixel data processor 1. The processing unit 3 includes an intensity processor 31, a saturation processor 32, and a determination processor 33. For example, FIG. 3a shows an image frame 4 to be processed by the processing unit 3.

Figure 3C:
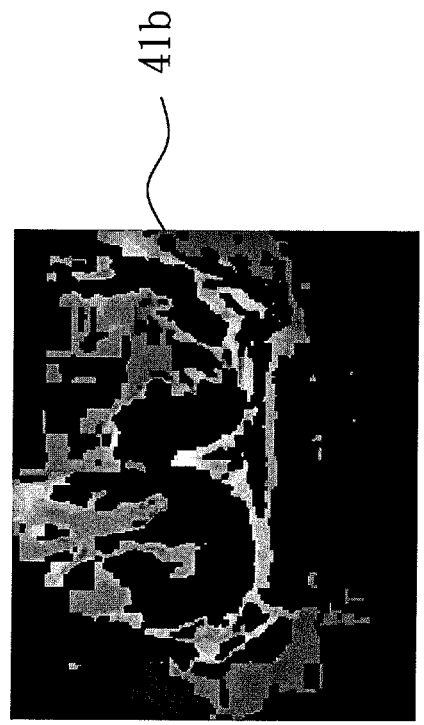
Figure 3B:
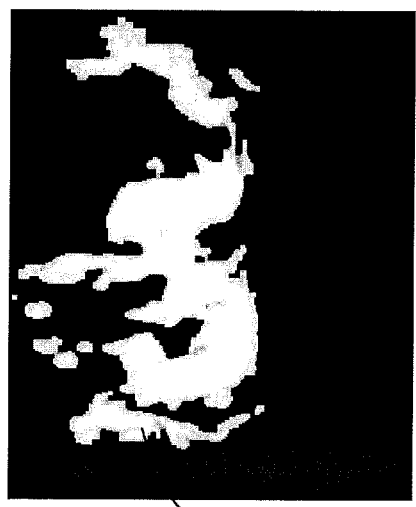

For each image frame, the intensity processor 31 is configured to filter the pixels based on the intensity values corresponding to the pixels, and the intensity reference information from the memory unit 2 to divide the pixels into intensity foreground pixels associated with fire-like intensity performance and intensity background pixels so as to obtain an intensity foreground area corresponding to the intensity foreground pixels, to determine whether the intensity foreground area is greater than a predetermined intensity foreground area threshold, and to then define within a corresponding image frame a fire-like image region that contains the intensity foreground pixels upon detecting that the intensity foreground area is greater than the predetermined intensity foreground area threshold. For example, FIG. 3b shows a sub-image frame (41a) that consists of the intensity foreground pixels of the image frame 4 of FIG. 3a, and a rectangular image region 41 shown in FIG. 3a serves as the fire-like image region corresponding to the image frame 4.

In this embodiment, the intensity foreground pixels for each image frame are obtained through static intensity filtering and dynamic intensity filtering performed by the intensity processor 31. For each intensity foreground pixel of the corresponding image frame, the static intensity filtering means that the intensity value ($p_{(I)}$) is greater than the predetermined intensity foreground threshold stored in the memory unit 2, such as 200, i.e., $p_{(I)} > 200$, and the intensity dynamic filtering means that a difference ($\sigma_{(I)}$) between the intensity value ($p_{(I)}$), and a corresponding intensity average value ($\overline{P}_{(I)}$) from the memory unit 2 is greater than a product of a corresponding intensity average variation threshold ($\overline{\sigma}_{(I)threshold}$) and the predetermined intensity amplification ratio ($B_{(I)}$) from the memory unit 2, such as 1.0, i.e., $\sigma_{(I)} > B_{(I)} \times \overline{\sigma}_{(I)threshold}$.

On the other hand, for each intensity background pixel divided from the pixels of the corresponding image frame, the intensity processor 31 updates a corresponding intensity average variation value ($\overline{\sigma}_{(I)}$) stored in the memory unit 2 with a sum of a product of the predetermined intensity weight ($\beta_{(I)}$) from the memory unit 2, such as 0.9, and a difference between the intensity value ($p_{(I)}$), and the corresponding intensity average value ($\overline{P}_{(I)}$) from the memory unit 2, and a product of the corresponding intensity average variation value ($\sigma_{(I)}$) from the memory unit 2 and a difference between 1 and the predetermined intensity weight ($\beta_{(I)}$). That is, $\overline{\sigma}_{(I)} \leftarrow \beta_{(I)}|p_{(I)} - \overline{P}_{(I)}| + (1-\beta_{(I)})\overline{\sigma}_{(I)}$. Furthermore, the intensity processor 31 updates the corresponding intensity average value ($\overline{P}_{(I)}$) stored in the memory unit 2 with a sum of a product of the predetermined intensity weight ($\beta_{(I)}$) from the memory unit 2 and the intensity value ($p_{(I)}$), and a product of the corresponding intensity average value ($\overline{P}_{(I)}$) from the memory unit 2 and the difference between 1 and the predetermined intensity weight ($\beta_{(I)}$) from the memory unit 2. That is, $\overline{P}_{(I)} \leftarrow \beta_{(I)}p_{(I)} + (1-\beta_{(I)})\overline{P}_{(I)}$. In addition, the intensity processor 31 updates the corresponding intensity average variation threshold ($\overline{\sigma}_{(I)threshold}$) stored in the memory unit 2 with a larger one of the predetermined intensity variation lower limit value ($\sigma_{(I)min}$) and the corresponding intensity average variation value ($\overline{\sigma}_{(I)}$) from the memory unit 2. That is, $\overline{\sigma}_{(I)threshold} \leftarrow \max(\sigma_{(I)min}, \overline{\sigma}_{(I)})$.

The saturation processor 32 is configured to filter all pixels in the fire-like image region defined by the intensity processor based on the saturation values corresponding to all the pixels in the fire-like image region, and the saturation reference information from the memory unit 2 to divide all the pixels in the fire-like image region into first saturation foreground pixels associated with weak-fire saturation performance and saturation background pixels so as to obtain a first saturation foreground area corresponding to the first saturation foreground pixels. For example, FIG. 3c shows a sub-image frame (41b) that consists of the first saturation foreground pixels of the fire-like image region, i.e., the rectangular image region 41, in FIG. 3a.

In this embodiment, the first saturation foreground pixels for the fire-like image region of the corresponding image frame are obtained through static saturation filtering and dynamic saturation filtering performed by the saturation processor 32. For each first saturation foreground pixel of the corresponding image frame, the static saturation filtering means that the saturation value ($p_{(S)}$) is within a range from the predetermined saturation lower limit value from the memory unit 2, such as 0.15, to the predetermined saturation upper limit value from the memory unit 2, such as 0.3, i.e., $0.15 < p_{(S)} < 0.3$, and the dynamic saturation filtering means that a difference ($\sigma_{(S)}$) between the saturation value $p_{(S)}$, and a corresponding saturation average value ($\overline{P}_{(S)}$) from the memory unit 2 is greater than a product of a corresponding saturation average variation threshold ($\overline{\sigma}_{(S)threshold}$) and the predetermined saturation amplification ratio ($B_{(S)}$) from the memory unit 2, such as 1.2, i.e., $\sigma_{(S)} > B_{(S)} \times \overline{\sigma}_{(S)threshold}$.

On the other hand, for each of the saturation background pixels of the fire-like image region of the corresponding image frame, the saturation processor 32 updates a corresponding saturation average variation value ($\overline{\sigma}_{(S)}$) stored in the memory unit 2 with a sum of a product of the predetermined saturation weight ($\beta_{(S)}$) from the memory unit 2, such as 0.1, and a difference between the saturation value ($p_{(S)}$) and the corresponding saturation average value ($\overline{P}_{(S)}$) from the memory unit 2, and a product of the corresponding saturation average variation value ($\overline{\sigma}_{(S)}$) from the memory unit 2 and a difference between 1 and the predetermined saturation weight ($\beta_{(S)}$) from the memory unit 2. That is, $\overline{\sigma}_{(S)} \leftarrow \beta_{(S)}|p_{(S)} - \overline{P}_{(S)}| + (1-\beta_{(S)})\overline{\sigma}_{(S)}$. Furthermore, the saturation processor 32 updates the corresponding saturation average value ($\overline{P}_{(S)}$) stored in the memory unit 2 with a sum of a product of the predetermined saturation weight ($\beta_{(S)}$) from the memory unit 2 and the saturation value ($p_{(S)}$), and a product of the corresponding saturation average value ($\overline{P}_{(S)}$) from the memory unit 2 and the difference between 1 and the predetermined saturation weight ($\beta_{(S)}$) from the memory unit 2. That is, $\overline{P}_{(S)} \leftarrow \beta_{(S)}p_{(S)} + (1-\beta_{(S)})\overline{P}_{(S)}$. In addition, the saturation processor 32 updates a corresponding saturation average variation threshold ($\overline{\sigma}_{(S)threshold}$) stored in the memory unit 2 with a larger one of the predetermined saturation variation lower limit value ($\sigma_{(S)min}$) from the memory unit 2, such as 0.01, and the corresponding saturation average variation value ($\overline{\sigma}_{(S)}$) from the memory unit 2, i.e., $\overline{\sigma}_{(S)threshold} \leftarrow \max(\sigma_{(S)min}, \overline{\sigma}_{(S)})$.

For the fire-like image region of the corresponding image frame, the saturation processor 32 further obtains, from the first saturation foreground pixels, second saturation foreground pixels, which do not overlap the intensity foreground pixels obtained by the intensity processor 31, so as to obtain a second saturation foreground area corresponding to the second saturation foreground pixels.

The determination processor 33 is configured to combine the intensity foreground area and the first saturation foreground area associated with the corresponding image frame to form a first two-dimensional (2-D) coordinate, and to combine the intensity foreground area and the second saturation foreground area associated with the corresponding image frame to form a second 2-D coordinate. When a number (N) of the first 2-D coordinates and a number (N) of the second 2-D coordinates are formed consecutively by the determination processor 33, the determination processor 33 performs linear regression analyses on the number (N) of the first 2-D coordinates to generate a first determination coefficient ($R_1^2$), and performs linear regression analyses on the number (N) of the second 2-D coordinates to generate a second determination coefficient ($R_2^2$). In this embodiment, the determination processor 33 determines whether a flame image exists in the image frames from the image capturing device 901 based on the first and second determination coefficients ($R_1^2$, $R_2^2$) and a predetermined identification threshold. In other embodiments, the determination processor 33 can determine whether a flame image exists in the image frames based on the first determination coefficient ($R_1^2$) and the predetermined identification threshold. More specifically, when each of the first and second determination coefficients ($R_1^2$, $R_2^2$) is greater than the predetermined identification threshold, such as 0.5, the determination processor 33 determines that a flame image exists in the image frames from the image capturing device 901. It means a flame indeed occurs in the monitored area. In this case, the determination processor 33 outputs a real-flame signal. When the first determination coefficient ($R_1^2$) is greater than the predetermined identification threshold while the second determination coefficient ($R_2^2$) is less than the predetermined identification threshold, the determination processor 33 determines that no flame image exists in the image frames from the image capturing device 901. In this case, the determination processor outputs a false-flame signal. It means that a false-flame image corresponding to a reflective or lighting object may exist in the image frames from the image capturing device 901. That is, no flame occurs in the monitored area.

Then, the fire detecting system generate an warning output upon receipt of the real-flame signal from the determination processor 33, and generates a fire alarm using an alarm device (not shown) when the determination processor 33 has continued to generate the real-flame signal during a predetermined time period, such as 10 seconds.

In an experiment for identifying various objects using the flame identification device under parameter conditions shown in Table 1 below, the experimental results related to the first and second determination coefficients ($R_1^2$, $R_2^2$) are shown in Table 2 below.

TABLE 1

| parameters | Predetermined value |
| --- | --- |
| intensity foreground threshold | 200 |
| saturation lower limit value | 0.15 |
| saturation upper limit value | 0.3 |
| $\sigma_{(I)min}$ | 9 |
| $\sigma_{(S)min}$ | 0.01 |
| $B_{(I)}$ | 1.0 |
| $B_{(S)}$ | 1.2 |
| $\beta_{(I)}$ | 0.9 |
| $\beta_{(S)}$ | 0.1 |

TABLE 2

| Identification objects | $R_1^2$ | $R_2^2$ |
| --- | --- | --- |
| flame produced by burning gasoline | 0.5306 | 0.5265 |
| flame produced by burning a paper bag | 0.66 | 0.6536 |
| flame produced by burning a paper box | 0.8683 | 0.8423 |
| flame produced by burning papers | 0.8023 | 0.7941 |
| light-colored clothing worn on a person | 0.0011 | 0.001 |
| reflection of the ground | 0.006 | 0.006 |
| candlelight | 8e-05 | 7e-05 |
| plastic bag | 0.723 | 0.179 |
| moving night light | 0.028 | 0.026 |
| moving flashlight | 0.055 | 0.049 |

As shown in Table 2, for a flame produced by burning gasoline, a paper bag, a paper box or paper, the flame identification device of the present invention can successfully identify a real-flame image through the first and second determination coefficients ($R_1^2$, $R_2^2$) greater than 0.5. On the other hand, for a plastic bag, the flame identification device generates the first determination coefficient ($R_1^2$) greater than 0.5 and the second determination coefficient ($R_2^2$) less than 0.5. Therefore, a false-flame image corresponding to the plastic bag can also be successfully identified.

In sum, the flame identification device of the present invention can successfully identify a real-flame image or a false-flame image that exists in the image frames from the image capturing device 901 without a computer appliance with high computation capability for FFT analyses. As such, due to the presence of the flame identification device, the fire detecting system can improve the accuracy of flame detection and reduce the possibilities of the false fire alarm.

Figure 4A:
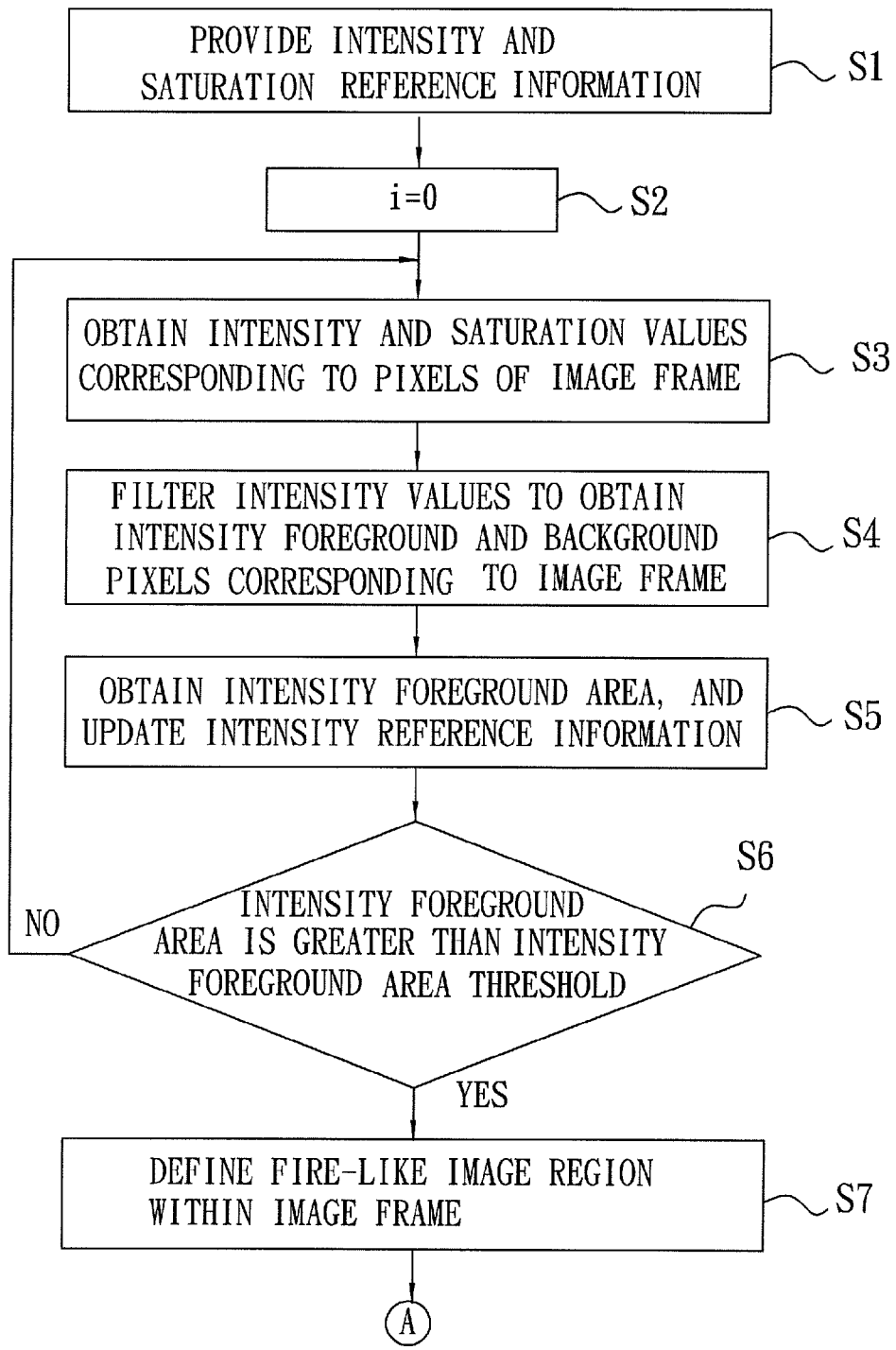
FIGS. 4a and 4b are flow charts illustrating a flame identification method performed by the preferred embodiment.
Figure 4B:
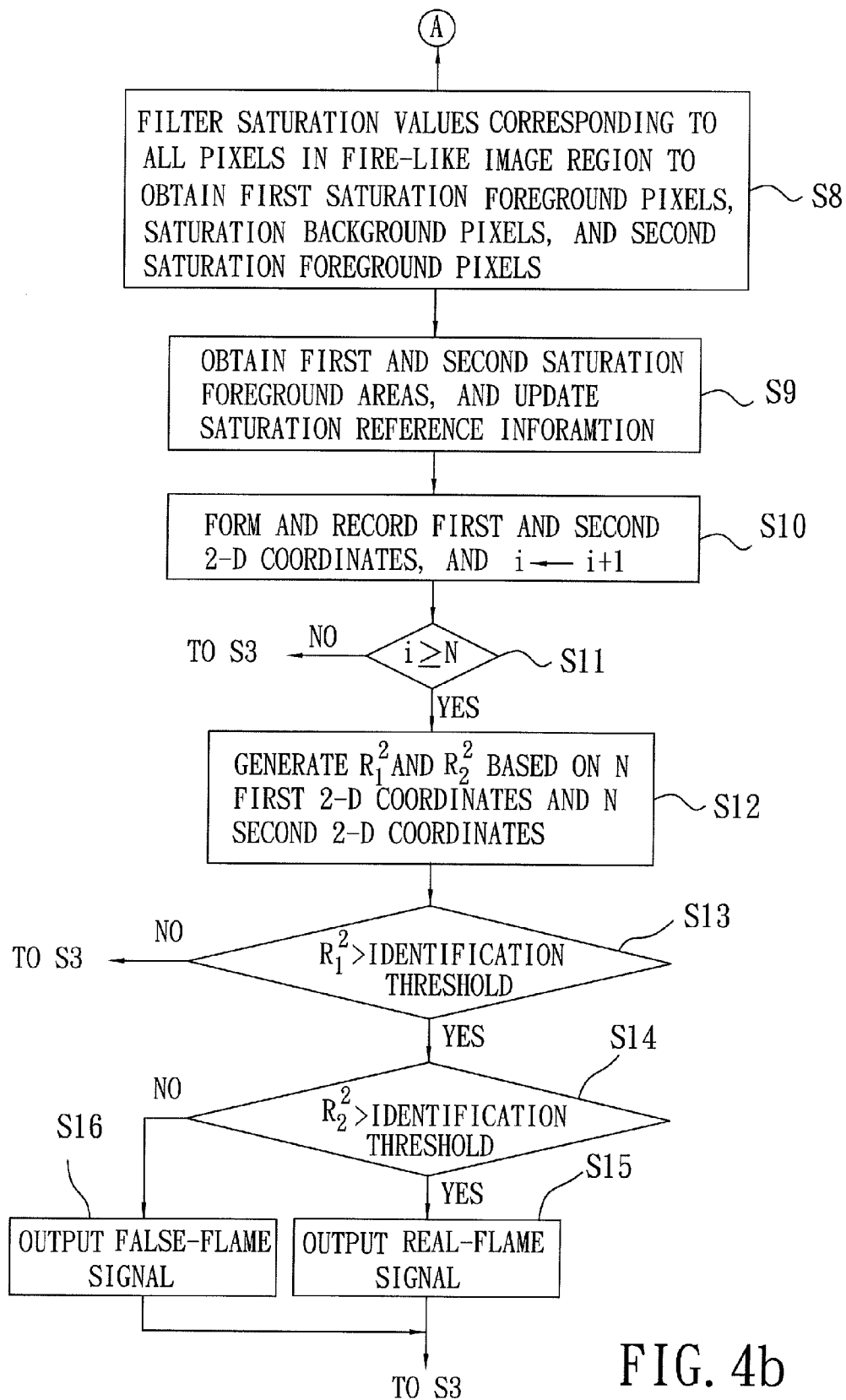

FIG. 4 illustrates a flow chart of a flame identification method performed by the flame identification device of the present invention.

In step S1, the intensity reference information and the saturation reference information are stored in the memory unit 2.

In step S2, initially, a parameter (i) is set to 0.

In step S3, the pixel data processor 1 converts the pixel data corresponding to the pixels of an image frame captured by the image capturing device 901 into hue values, saturation values and intensity values.

In step S4, the intensity processor 31 filters the intensity values to divide the pixels into intensity foreground pixels and intensity background pixels.

In step S5, the intensity processor 31 obtains an intensity foreground area corresponding to the intensity foreground pixels obtained in step S4, and updates the intensity average values ($\overline{P}_{(I)}$) and the intensity average variation values ($\overline{\sigma}_{(I)}$), and the intensity average variation thresholds ($\overline{\sigma}_{(I)threshold}$) stored in the memory unit 2 and corresponding to the intensity background pixels.

In step S6, the intensity processor 31 determines whether the intensity foreground area is greater than the predetermined intensity foreground area threshold from the memory unit 2. If the result is affirmative, the flow proceeds to step S7. Otherwise, the flow goes back to step S3.

In step S7, the intensity processor 31 defines a fire-like region within the image frame.

In step S8, the saturation processor 32 filters the saturation values corresponding to all pixels in the fire-like region to divide all the pixels into first saturation foreground pixels and saturation background pixels, and obtains second saturation foreground pixels from the first saturation foreground pixels.

In step S9, the saturation processor 32 obtains a first saturation foreground area corresponding to the first saturation foreground pixels, and a second saturation foreground area corresponding to the second saturation foreground pixels. In addition, the saturation processor 32 updates the saturation average values ($\overline{P}_{(S)}$), the saturation average variation values ($\overline{\sigma}_{(S)}$), and the saturation average variation thresholds ($\overline{\sigma}_{(S)threshold}$) stored in the memory unit 2 and corresponding to the first saturation background pixels in the fire-like region of the image frame.

In step S10, the determination processor 33 combines the intensity foreground area and the first saturation foreground area to form a first 2-D coordinate, and combines the intensity foreground area and the second saturation foreground area to form a second 2-D coordinate. The determination processor 33 records the first and second 2-D coordinates. In addition, the parameter (i) is set to i+1. That is, the parameter (i) denotes the number of the first 2-D coordinate or the second 2-D coordinate recorded by the determination processor 33.

In step S11, the determination processor 33 determines whether the parameter (i) is not less than N. If the result is affirmative, the flow proceeds to step S12. Otherwise, the flow goes back to step S3.

In step S12, the determination processor 33 performs linear regression analyses on a number (N) of the first 2-D coordinates recorded consecutively thereby to generate a first determination coefficient ($R_1^2$), and performs linear regression analyses on a number (N) of the second 2-D coordinates recorded consecutively thereby to generate a second determination coefficient ($R_2^2$).

In step S13, the determination processor 33 determines whether the first determination coefficient ($R_1^2$) is greater than the predetermined identification threshold. If the result is affirmative, the flow proceeds to step S14. Otherwise, the flow goes back to step S3.

In step S14, the determination processor 33 determines whether the first determination coefficient ($R_1^2$) is greater than the predetermined identification threshold. If the result is affirmative, the flow goes to step S15. Otherwise, the flow goes to step S16.

In step S15, the determination processor 33 outputs a real-flame signal indicating that a real-flame image exists in the processed image frames. That is, a flame indeed occurs in the monitored area.

In step S16, the determination processor 33 outputs a false-flame signal indicating that a false-flame image exists in the processed image frames. That is, no flame occurs in the monitored area. Then, the flow goes back to step S3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A flame identification method of identifying any flame image in a plurality of image frames captured consecutively from a monitored area, each of image frames including a plurality of pixels each having pixel data converted into a hue value, a saturation value and an intensity value in hue-saturation-intensity (HSI) color space, said flame identification method comprising the steps of:
   a) for each of the image frames,
      filtering the pixels based on the intensity values corresponding to the pixels, and intensity reference information to divide the pixels into intensity foreground pixels associated with fire-like intensity performance and intensity background pixels so as to obtain an intensity foreground area corresponding to the intensity foreground pixels, and so as to define within a corresponding one of the image frames a fire-like image region that contains the intensity foreground pixels when the intensity foreground area is greater than a predetermined intensity foreground area threshold,
      filtering all pixels in the fire-like image region based on the saturation values corresponding to all the pixels in the fire-like image region, and saturation reference information to divide all the pixels in the fire-like image region into first saturation foreground pixels associated with weak-fire saturation performance and saturation background pixels so as to obtain a first saturation foreground area corresponding to the first saturation foreground pixels, and
      combining the intensity foreground area and the first saturation foreground area associated with the corresponding one of image frames to form a first two-dimensional (2-D) coordinate;
   b) when a number (N) of the first 2-D coordinates corresponding to a sequence of the image frames are formed consecutively in step a), performing linear regression analyses on the first 2-D coordinates to generate a first determination coefficient; and
   c) determining whether a flame image exists in the image frames based on the first determination coefficients generated in step b) and a predetermined identification threshold.

2. The flame identification method as claimed in claim 1, wherein, in step c), when the first determination coefficient is greater than the predetermined identification threshold, it is determined that a flame image exists in the image frames.

3. The flame identification method as claimed in claim 1, prior to step b), further comprising the step of:
   b-0) for the fire-like image region of the corresponding one of the image frames, obtaining from the first saturation foreground pixels obtained in step a) second saturation foreground pixels, which do not overlap the intensity foreground pixels of the corresponding one of the image frames obtained in step a), so as to obtain a second saturation foreground area corresponding to the second saturation foreground pixels, and combining the intensity foreground area and the second saturation foreground area associated with the corresponding one of the image frames to form a second 2-D coordinate;
   wherein, in step b), when a number (N) of the second 2-D coordinates are formed consecutively in step b-0), linear regression analyses are further performed on the second 2-D coordinates to generate a second determination coefficient; and
   wherein, in step c), whether a flame image exists in the image frames is determined further based on the second determination coefficient generated in step b).

4. The flame identification method as claimed in claim 3, wherein, in step c), it is determined that a flame image exists in the image frames when each of the first and second determination coefficients is greater than the predetermined identification threshold.

5. The flame identification method as claimed in claim 1, wherein in step a):
   the intensity reference information includes a predetermined intensity foreground threshold, a predetermined intensity variation lower limit value ($\sigma_{(I)min}$), a predetermined intensity amplification ratio ($B_{(I)}$), a predetermined intensity weight ($\beta_{(I)}$), and a plurality of sets of intensity average values ($\overline{P}_{(I)}$), intensity average variation values ($\overline{\sigma}_{(I)}$) and intensity average variation thresholds ($\overline{\sigma}_{(I)threshold}$), each set of the intensity average value ($\overline{P}_{(I)}$), the intensity average variation value ($\overline{\sigma}_{(I)}$) and the intensity average variation threshold ($\overline{\sigma}_{(I)threshold}$) being preset previously for a corresponding pixel;
   for each of the intensity foreground pixels divided from the pixels of the corresponding one of the image frames,
      the intensity value is greater than the predetermined intensity foreground threshold, and
      a difference between the intensity value, and a corresponding intensity average value ($\overline{P}_{(I)}$) is greater than a product of a corresponding intensity average variation threshold ($\overline{\sigma}_{(I)threshold}$) and the predetermined intensity amplification ratio ($B_{(I)}$); and for each of the intensity background pixels divided from the pixels of the corresponding one of the image frames,
- a corresponding intensity average variation value ($\overline{\sigma}_{(I)}$) is updated with a sum of a product of the predetermined intensity weight ($\sigma_{(I)}$) and a difference between the intensity value and the corresponding intensity average value ($\overline{P}_{(I)}$), and a product of the corresponding intensity average variation value ($\overline{\sigma}_{(I)}$) and a difference between 1 and the predetermined intensity weight ($\beta_{(I)}$),
- the corresponding intensity average value ($\overline{P}_{(I)}$) is updated with a sum of a product of the predetermined intensity weight ($\beta_{(I)}$) and the intensity value, and a product of the corresponding intensity average value ($\overline{P}_{(I)}$) and the difference between 1 and the predetermined intensity weight ($\beta_{(I)}$), and
- a corresponding intensity average variation threshold ($\overline{\sigma}_{(I)threshold}$) is up dated with a larger one of the predetermined intensity variation lower limit value ($\sigma_{(I)min}$) and the corresponding intensity average variation value ($\overline{\sigma}_{(I)}$).

6. The flame identification method as claimed in claim 1, wherein in step a):
the saturation reference information includes a predetermined saturation lower limit value, a predetermined saturation upper limit value, a predetermined saturation variation lower limit value ($\sigma_{(S)min}$), a predetermined saturation amplification ratio ($B_{(S)}$), a predetermined saturation weight ($\beta_{(S)}$), and a plurality of sets of saturation average values ($\overline{P}_{(S)}$) saturation average variation values ($\overline{\sigma}_{(S)}$) and saturation average variation thresholds ($\overline{\sigma}_{(S)threshold}$), each set of the saturation average value ($\overline{P}_{(S)}$), the saturation average variation value ($\overline{\sigma}_{(S)}$) and the saturation average variation threshold ($\overline{\sigma}_{(S)threshold}$) being preset previously for a corresponding pixel;
for each of the first saturation foreground pixels divided from all the pixels in the fire-like image region of the corresponding one of the image frames,
- the saturation value is within a range from the predetermined saturation lower limit value to the predetermined saturation upper limit value, and
- a difference between the saturation value, and a corresponding saturation average value ($\overline{P}_{(S)}$) is greater than a product of a corresponding saturation average variation threshold ($\overline{\sigma}_{(S)threshold}$) and the predetermined saturation amplification ratio ($B_{(S)}$); and
for each of the saturation background pixels divided from all the pixels in the fire-like image region of the corresponding one of the image frames,
- a corresponding saturation average variation value ($\overline{\sigma}_{(S)}$) is updated with a sum of a product of the predetermined saturation weight ($\beta_{(S)}$) and a difference between the saturation value and the corresponding saturation average value ($\overline{P}_{(S)}$), and a product of the corresponding saturation average variation value ($\overline{\sigma}_{(S)}$) and a difference between 1 and the predetermined saturation weight ($\beta_{(S)}$),
- the corresponding saturation average value ($\overline{P}_{(S)}$) is updated with a sum of a product of the predetermined saturation weight ($\beta_{(S)}$) and the saturation value, and a product of the corresponding saturation average value ($\overline{P}_{(S)}$) and the difference between 1 and the predetermined saturation weight ($\beta_{(S)}$), and
- a corresponding saturation average variation threshold ($\overline{\sigma}_{(S)threshold}$) updated with a larger one of the predetermined saturation variation lower limit value ($\sigma_{(S)min}$) and the corresponding saturation average variation value ($\overline{\sigma}_{(S)}$).

7. A flame identification device for identifying any flame image in a plurality of image frames captured consecutively from a monitored area, each of the image frames including a plurality of pixels, each of which has pixel data, said flame identification device comprising:
- a pixel data processor for converting the pixel data of each of the pixels of each of the image frames into a hue value, a saturation value and an intensity value in the hue-saturation-intensity (HSI) color space;
- a memory unit for storing intensity reference information and saturation reference information; and
- a processing unit coupled to said pixel data processor and said memory unit, and receiving the intensity values and the saturation values corresponding to each of the image frames from said pixel data processor, and including
  - an intensity processor configured to filter, for each of the image frames, the pixels based on the intensity values corresponding to the pixels, and the intensity reference information from said memory unit to divide the pixels into intensity foreground pixels associated with fire-like intensity performance and intensity background pixels so as to obtain an intensity foreground area corresponding to the intensity foreground pixels, to determine whether the intensity foreground area is greater than a predetermined intensity foreground area threshold, and to define within a corresponding one of the image frames a fire-like image region that contains the intensity foreground pixels upon detecting that the intensity foreground area is greater than the predetermined intensity foreground area threshold, and
  - a saturation processor configured to filter all pixels in the fire-like image region defined by said intensity processor based on the saturation values corresponding to all the pixels in the fire-like image region, and the saturation reference information from said memory unit to divide all the pixels in the fire-like image region into first saturation foreground pixels associated with weak-fire saturation performance and saturation background pixels so as to obtain a first saturation foreground area corresponding to the first saturation foreground pixels, and
  - a determination processor configured to combine the intensity foreground area and the first saturation foreground area associated with the corresponding one of the image frames to form a first two-dimensional (2-D) coordinate, to perform linear regression analyses on a number (N) of the first 2-D coordinates formed consecutively thereby to generate a first determination coefficient, and to determine whether a flame image exists in the image frames based on the first determination coefficient and a predetermined identification threshold.

8. The flame identification device as claimed in claim 7, wherein, when the first determination coefficient is greater than the predetermined identification threshold, said determination processor determines that a flame image exists in the image frames.

9. The flame identification device as claimed in claim 7, wherein:
for the fire-like image region of the corresponding one of the image frames, said saturation processor further obtains, from the first saturation foreground pixels, second saturation foreground pixels, which do not overlap the intensity foreground pixels of the corresponding one of the image frames obtained by said intensity processor, so as to obtain a second saturation foreground area corresponding to the second saturation foreground pixels; and said determination processor further combines the intensity foreground area and the second saturation foreground area associated with the corresponding one of the image frames to form a second 2-D coordinate, performs linear regression analyses further on a number (N) of the second 2-D coordinates formed consecutively thereby to generate a second determination coefficient, and determines whether a flame image exists in the image frames further based on the second determination coefficient.

10. The flame identification device as claimed in claim 9, wherein said determination processor determines that a flame image exists in the image frames when each of the first and second determination coefficients is greater than the predetermined identification threshold.

11. The flame identification device as claimed in claim 7, wherein:

the intensity reference information stored in said memory unit includes a predetermined intensity foreground threshold, a predetermined intensity variation lower limit value ($\sigma_{(I)min}$), a predetermined intensity amplification ratio ($B_{(I)}$), a predetermined intensity weight ($\beta_{(I)}$), and a plurality of sets of intensity average values ($\overline{P}_{(I)}$), intensity average variation values ($\overline{\sigma}_{(I)}$) and intensity average variation thresholds ($\overline{\sigma}_{(I)threshold}$), each set of the intensity average value ($\overline{P}_{(I)}$), the intensity average variation value ($\overline{\sigma}_{(I)}$) and the intensity average variation thresholds ($\overline{\sigma}_{(I)threshold}$) being preset previously for a corresponding pixel;

for each of the intensity foreground pixels divided by said intensity processor from the pixels of the corresponding one of the image frames, the intensity value is greater than the predetermined intensity foreground threshold from said memory unit, and a difference between the intensity value, and a corresponding intensity average value ($\overline{P}_{(I)}$) from said memory unit is greater than a product of a corresponding intensity average variation threshold ($\overline{\sigma}_{(I)threshold}$) and the predetermined intensity amplification ratio ($B_{(I)}$) from said memory unit; and for each of the intensity background pixels divided by said intensity processor from the corresponding one of the image frames, said intensity processor updates a corresponding intensity average variation value ($\overline{\sigma}_{(I)}$) stored in said memory unit with a sum of a product of the predetermined intensity weight ($\beta_{(I)}$) from said memory unit and a difference between the intensity value, and the corresponding intensity average value ($\overline{P}_{(I)}$) from said memory unit, and a product of the corresponding intensity average variation value ($\overline{\sigma}_{(I)}$) from said memory unit and a difference between 1 and the predetermined intensity weight ($\beta_{(I)}$) from said memory unit, said intensity processor updates the corresponding intensity average value ($\overline{P}_{(I)}$) stored in said memory unit with a sum of a product of the predetermined intensity weight ($\beta_{(I)}$) from said memory unit and the intensity value, and a product of the corresponding intensity average value ($\overline{P}_{(I)}$) from said memory unit and the difference between 1 and the predetermined intensity weight ($\beta_{(I)}$) from said memory unit, and said intensity processor updates a corresponding intensity average variation threshold ($\overline{\sigma}_{(I)threshold}$) stored in said memory unit with a larger one of the predetermined intensity variation lower limit value ($\sigma_{(I)min}$) and the corresponding intensity average variation value ($\overline{\sigma}_{(I)}$) from said memory unit.

12. The flame identification device as claimed in claim 7, wherein:

the saturation reference information stored in said memory unit includes a predetermined saturation lower limit value, a predetermined saturation upper limit value, a predetermined saturation variation lower limit value ($\sigma_{(S)min}$), a predetermined saturation amplification ratio ($B_{(S)}$), a predetermined saturation weight ($\beta_{(S)}$) and a plurality of sets of saturation average values ($\overline{P}_{(S)}$), saturation average variation values ($\overline{\sigma}_{(S)}$) and saturation average variation thresholds ($\overline{\sigma}_{(S)threshold}$), each set of the saturation average value ($\overline{P}_{(S)}$), the saturation average variation value ($\overline{\sigma}_{(S)}$) and the saturation average variation threshold ($\overline{\sigma}_{(S)threshold}$) being preset previously for a corresponding pixel;

for each of the first saturation foreground pixels divided by said saturation processor from the fire-like image region of the corresponding one of the image frames, the saturation value is within a range from the predetermined saturation lower limit value from said memory unit to the predetermined saturation upper limit value from said memory unit, and a difference between the saturation value, and a corresponding saturation average value ($\overline{P}_{(S)}$) from said memory unit is greater than a product of a corresponding saturation average variation threshold ($\overline{\sigma}_{(S)threshold}$) and the predetermined saturation amplification ratio ($B_{(S)}$) from said memory unit; and for each of the saturation background pixels divided by said saturation processor from the fire-like image region of the corresponding one of the image frames, said saturation processor updates a corresponding saturation average variation value ($\overline{\sigma}_{(S)}$) stored in said memory unit with a sum of a product of the predetermined saturation weight ($\beta_{(S)}$) from said memory unit and a difference between the saturation value, and the corresponding saturation average value ($\overline{P}_{(S)}$) from said memory unit, and a product of the corresponding saturation average variation value ($\overline{\sigma}_{(S)}$) from said memory unit and a difference between 1 and the predetermined saturation weight ($\beta_{(S)}$) from said memory unit, said saturation processor updates the corresponding saturation average value ($\overline{P}_{(S)}$) stored in said memory unit with a sum of a product of the predetermined saturation weight ($\beta_{(S)}$) from said memory unit and the saturation value, and a product of the corresponding saturation average value ($\overline{P}_{(S)}$) from said memory unit and the difference between 1 and the predetermined saturation weight ($\beta_{(S)}$) from said memory unit, and said saturation processor updates a corresponding saturation average variation threshold ($\overline{\sigma}_{(S)threshold}$) stored in said memory unit with a larger one of the predetermined saturation variation lower limit value ($\sigma_{(S)min}$) from said memory unit and the corresponding saturation average variation value ($\overline{\sigma}_{(S)}$) from said memory unit.

\* \* \* \* \*